United States Patent
Nakajima et al.

(10) Patent No.: US 10,252,257 B2
(45) Date of Patent: Apr. 9, 2019

(54) ION EXCHANGE MEMBRANE

(71) Applicant: ASAHI KASEI KABUSHIKI KAISHA, Tokyo (JP)

(72) Inventors: Atsushi Nakajima, Tokyo (JP); Naoki Sakamoto, Tokyo (JP); Takuya Morikawa, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 15/574,976

(22) PCT Filed: May 16, 2016

(86) PCT No.: PCT/JP2016/064526
§ 371 (c)(1),
(2) Date: Nov. 17, 2017

(87) PCT Pub. No.: WO2016/186083
PCT Pub. Date: Nov. 24, 2016

(65) Prior Publication Data
US 2018/0126370 A1 May 10, 2018

(30) Foreign Application Priority Data
May 18, 2015 (JP) ................................. 2015-101292

(51) Int. Cl.
*B01J 39/18* (2017.01)
*B01J 39/04* (2017.01)
*B01J 39/20* (2006.01)
*B01J 47/12* (2017.01)
*B32B 27/30* (2006.01)
*C08F 16/30* (2006.01)
*C25B 13/08* (2006.01)
*C25B 9/00* (2006.01)
*C08L 27/18* (2006.01)
*B32B 27/32* (2006.01)
*C08J 5/22* (2006.01)

(52) U.S. Cl.
CPC .............. *B01J 39/18* (2013.01); *B01J 39/04* (2013.01); *B01J 39/20* (2013.01); *B01J 47/12* (2013.01); *B32B 27/30* (2013.01); *B32B 27/322* (2013.01); *C08F 16/30* (2013.01); *C08J 5/2237* (2013.01); *C08J 5/2281* (2013.01); *C08L 27/18* (2013.01); *C25B 9/00* (2013.01); *C25B 13/08* (2013.01); *B32B 2307/732* (2013.01); *C08J 2327/12* (2013.01); *C08J 2327/18* (2013.01)

(58) Field of Classification Search
CPC ... B01J 39/18; B01J 39/04; B01J 39/20; B01J 47/12; B32B 27/30; B32B 27/322; B32B 2307/732; C08F 16/30; C25B 13/08; C25B 9/00; C08J 5/2281; C08J 5/2237; C08J 2327/18; C08J 2327/12; C08L 27/18
USPC ......................................................... 521/27
See application file for complete search history.

(56) References Cited

U.S. PATENT DOCUMENTS

| | | | | |
|---|---|---|---|---|
| 2014/0360868 | A1* | 12/2014 | Yamaki | .................... B01J 39/20 204/296 |
| 2014/0367355 | A1 | 12/2014 | Kameyama et al. | |
| 2014/0377687 | A1 | 12/2014 | Miyake et al. | |
| 2016/0130710 | A1* | 5/2016 | Kaihara | .................... C08F 8/14 204/252 |

FOREIGN PATENT DOCUMENTS

| | | | |
|---|---|---|---|
| CN | 103243343 | A | 8/2013 |
| CN | 103243344 | A | 8/2013 |
| CN | 103243347 | A | 8/2013 |
| CN | 103668319 | A * | 3/2014 |
| CN | 103668319 | A | 3/2014 |
| JP | 2001-323084 | A | 11/2001 |
| JP | 2001323084 | A * | 11/2001 |
| JP | 2006-045671 | A | 2/2006 |
| JP | 2014-058707 | A | 4/2014 |
| WO | 2014203886 | A1 | 12/2014 |

OTHER PUBLICATIONS

European Search Report issued with respect to Application No. 16796476.6, dated Apr. 6, 2018.
International Search Report from Patent Application No. PCT/JP2016/064526, dated Jul. 19, 2016.
International Preliminary Report on Patentability from Patent Application No. PCT/JP2016/064526, dated Nov. 21, 2017.

* cited by examiner

Primary Examiner — Michael Bernshteyn
(74) Attorney, Agent, or Firm — Greenblum & Bernstein, P.L.C.

(57) ABSTRACT

The ion exchange membrane according to the present invention comprises a layer A comprising a fluorine-containing polymer having a sulfonic acid group and a layer B comprising a fluorine-containing polymer having a carboxylic acid group, wherein a ratio of an ion cluster diameter of the layer B after electrolysis under the following electrolysis conditions to the ion cluster diameter of the layer B before the electrolysis [(the ion cluster diameter of the layer B after the electrolysis)/(the ion cluster diameter of the layer B before the electrolysis)] is 0.83 to 0.95:
(Electrolysis Conditions)
in a zero-gap base electrolytic cell where the ion exchange membrane is disposed between an anode chamber to which a 3.5 N aqueous sodium chloride solution is supplied and a cathode chamber to which a 10.8 N aqueous sodium hydroxide solution is supplied, electrolysis is performed for 7 days under conditions having a temperature of 85° C. and a current density of 6 kA/m².

7 Claims, 2 Drawing Sheets

ION EXCHANGE MEMBRANE

TECHNICAL FIELD

The present invention relates to an ion exchange membrane.

BACKGROUND ART

Fluorine-containing ion exchange membranes have excellent heat resistance, chemical resistance, and the like, and are used in various applications as electrolytic diaphragms for alkali chloride electrolysis, ozone producing electrolysis, fuel cells, water electrolysis, hydrochloric acid electrolysis, and the like.

Among these, in alkali chloride electrolysis where chlorine and alkali hydroxide are produced in particular, the ion exchange membrane process is primarily used in recent years. The ion exchange membrane used in the electrolysis of alkali chloride is required to have various characteristics. For example, required are characteristics such as electrolytic performance that electrolysis can be performed at a high current efficiency and a low electrolytic voltage, and the concentration of impurities (such as alkali chloride in particular) contained in the produced alkali hydroxide is low, as well as membrane strength and like characteristics that the membrane strength is so high that no damage is incurred during membrane handling and electrolysis. In addition, while the electrolytic performance and the membrane strength of an ion exchange membrane are in a trade-off relationship, there are demands for the development of an ion exchange membrane having both at high levels.

Patent Literature 1 discloses an ion exchange membrane consisting of at least two layers, i.e., a fluorine-containing polymer layer having a sulfonic acid group and a fluorine-containing polymer layer having a carboxylic acid group.

CITATION LIST

Patent Literature

Patent Literature 1: Japanese Unexamined Patent Publication No. 2001-323084

SUMMARY OF INVENTION

Technical Problem

However, the ion exchange membrane described in Patent Literature 1 has room for further improvement on simultaneously improving membrane strength and electrolytic performance.

The present invention has been conceived in view of the problems of the conventional art described above, and an object of the present invention is to provide an ion exchange membrane having both excellent membrane strength and excellent electrolytic performance.

Solution to Problem

As a result of having conducted diligent research to solve the above problems, the present inventors found that electrolytic performance is dramatically improved by controlling ion clusters present in an ion exchange membrane to shrink during electrolysis such that the ion cluster diameter after electrolysis of the ion exchange membrane is reduced to a predetermined ratio relative to the ion cluster diameter before electrolysis, and accomplished the present invention.

That is to say, the present invention is as set forth below.

[1]

An ion exchange membrane comprising:

a layer A comprising a fluorine-containing polymer having a sulfonic acid group; and a layer B comprising a fluorine-containing polymer having a carboxylic acid group, wherein a ratio of an ion cluster diameter of the layer B after electrolysis under the following electrolysis conditions to the ion cluster diameter of the layer B before the electrolysis [(the ion cluster diameter of the layer B after the electrolysis)/(the ion cluster diameter of the layer B before the electrolysis)] is 0.83 to 0.95:

(Electrolysis Conditions)

in a zero-gap base electrolytic cell where the ion exchange membrane is disposed between an anode chamber to which a 3.5 N aqueous sodium chloride solution is supplied and a cathode chamber to which a 10.8 N aqueous sodium hydroxide solution is supplied, electrolysis is performed for 7 days under conditions having a temperature of 85° C. and a current density of 6 kA/m².

[2]

The ion exchange membrane according to [1], wherein the ion cluster diameter of the layer B before the electrolysis is 2.5 to 4.0 nm; and the ion cluster diameter of the layer B after the electrolysis is 2.0 to 3.3 nm.

[3]

The ion exchange membrane according to [1] or [2], wherein a sum of a thickness of the layer A and a thickness of the layer B before the electrolysis is 55 μm or more.

[4]

The ion exchange membrane according to any of [1] to [3], wherein the ion cluster diameter of the layer A before the electrolysis is 3.0 to 4.5 nm.

[5]

The ion exchange membrane according to any of [1] to [4], wherein a thickness of the layer A before the electrolysis is 50 to 180 μm; and a thickness of the layer B before the electrolysis is 5 to 20 μm.

[6]

The ion exchange membrane according to any of [1] to [5], wherein the layer A comprises a polymer of a compound represented by the following formula (2); and the layer B comprises a polymer of a compound represented by the following formula (3):

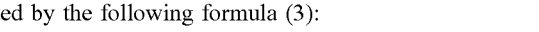

wherein a represents an integer of 0 to 2, b represents an integer of 1 to 4, and Y represents —F or —CF₃; and

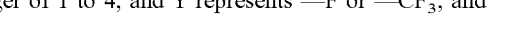

wherein c represents an integer of 0 to 2, d represents an integer of 1 to 4, Y represents —F or —CF₃, and R represents —CH₃, —C₂H₅, or —C₃H₇.

[7] An electrolytic cell comprising the ion exchange membrane according to any of [1] to [6].

Advantageous Effects of Invention

The ion exchange membrane of the present invention has excellent membrane strength and electrolytic performance.

DESCRIPTION OF EMBODIMENT

Below, an embodiment for carrying out the present invention (hereinafter referred to as "the present embodiment") will now be described in detail. The present invention is not limited to the present embodiment below, and can be carried out after making various modifications within the scope of the present invention.

The ion exchange membrane of the present embodiment has a layer A containing a fluorine-containing polymer having a sulfonic acid group (hereinafter sometimes simply referred to as "layer A"), and a layer B containing a fluorine-containing polymer having a carboxylic acid group (hereinafter sometimes simply referred to as "layer B"), wherein the ratio of the ion cluster diameter of the layer B after electrolysis under the following electrolysis conditions (1) to the ion cluster diameter of the layer B before the electrolysis [(the ion cluster diameter of the layer B after electrolysis)/(the ion cluster diameter of the layer B before electrolysis)] is 0.83 to 0.95. Here, the electrolysis conditions (1) are defined that electrolysis is performed for 7 days under conditions having a temperature of 85° C. and a current density of 6 kA/m$^2$ in a zero-gap base electrolytic cell where the ion exchange membrane is disposed between an anode chamber to which a 3.5 N aqueous sodium chloride solution is supplied and a cathode chamber to which a 10.8 N aqueous sodium hydroxide solution is supplied. Being thus configured, the ion exchange membrane of the present embodiment has excellent film strength and electrolytic performance. Below, electrolysis under the above electrolytic conditions (1) may be simply referred to as "electrolysis". In the present specification, the "zero-gap" means a state where the ion exchange membrane is in contact with both the cathode and the anode in an electrolytic layer (a state where the distance between the ion exchange membrane and the anode and the distance between the ion exchange membrane and the cathode are zero), and these components may be in a state where the entire surface of the electrode (the anode or cathode) is in contact with the ion exchange membrane or may be in a state where a certain point on the electrode surface is in contact with the ion exchange membrane.

Figure 1:
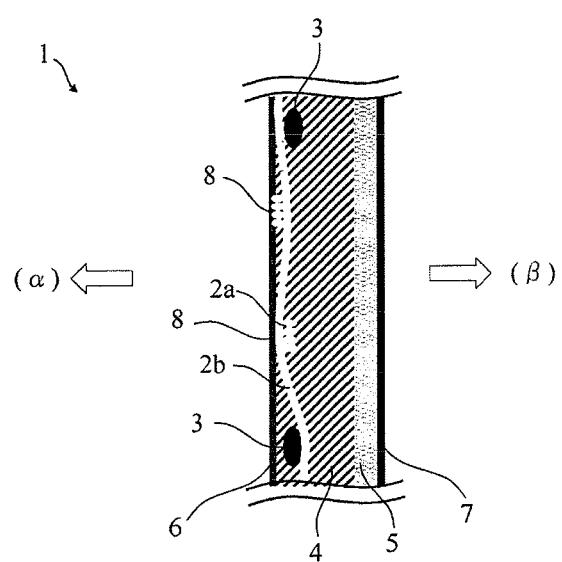
FIG. 1 is a schematic cross-sectional view of one example of an ion exchange membrane of the present embodiment.

FIG. 1 shows a schematic cross-sectional view of one example of the configuration of the ion exchange membrane of the present embodiment. In the ion exchange membrane of the present embodiment, the layer A (4) containing a fluorine-containing polymer having a sulfonic acid group and the layer B (5) containing a fluorine-containing polymer having a carboxylic acid group are laminated, and there are reinforcement core materials 3 and continuous holes 2a and 2b inside the membrane. Normally, the layer A (4) containing a fluorine-containing polymer having a sulfonic acid group is disposed on the anode side (α) of the electrolytic layer, and the layer B (5) containing a fluorine-containing polymer having a carboxylic acid group is disposed on the cathode side (β) of the electrolytic layer. The membrane surface has coating layers 6 and 7. In FIG. 1, the continuous hole 2a and the reinforcement core materials 3 are formed perpendicular to the paper, and the continuous hole 2b is formed parallel to the paper. That is to say, the continuous hole 2b formed parallel to the paper is formed in a direction substantially perpendicular to the reinforcement core materials 3. The continuous holes 2a and 2b may have portions 8 that appear on the anode-side surface of the layer A. As shown in FIG. 1, the ion exchange membrane of the present embodiment is preferably laminated such that the surface of the layer A and the surface of the layer B are in contact. Hereinafter, the layer A and the layer B may be collectively referred to as a membrane body.

[Layer A]

The layer A contained in the ion exchange membrane of the present embodiment contains a fluorine-containing polymer A having a sulfonic acid group (hereinafter sometimes simply referred to as a "polymer A") and, preferably, consists of the polymer A. Here, "the fluorine-containing polymer having a sulfonic acid group" refers to a fluorine-containing polymer having a sulfonic acid group or a sulfonic acid group precursor that can become a sulfonic acid group by hydrolysis. Other than the polymer A, the layer A may contain a polymer B, which will be described below, in a range of less than 20% by mass based on 100% by mass of the layer A, and preferably contains the polymer A in an amount of 80% by mass or more based on 100% by mass of the layer A.

The fluorine-containing polymer A having a sulfonic acid group, which constitutes the layer A, can be produced by, for example, copolymerizing a monomer of a first group and a monomer of a second group below, or homopolymerizing a monomer of a second group. In the case of being a copolymer, the polymer A may be a block polymer or may be a random polymer.

The monomer of the first group is not particularly limited and is, for example, a vinyl fluoride compound.

The vinyl fluoride compound is preferably a compound represented by the following general formula (1):

$$CF_2=CX_1X_2 \qquad (1)$$

wherein $X_1$ and $X_2$ each independently represent —F, —Cl, —H, or —CF$_3$.

The vinyl fluoride compound represented by the above general formula (1) is not particularly limited, and examples include vinyl fluoride, tetrafluoroethylene, hexafluoropropylene, vinylidene fluoride, trifluoroethylene, and chlorotrifluoroethylene.

In particular, in the case of using the ion exchange membrane of the present embodiment as a membrane for alkali electrolysis, the vinyl fluoride compound is preferably a perfluoro monomer, more preferably a perfluoro monomer selected from the group consisting of tetrafluoroethylene and hexafluoropropylene, and even more preferably tetrafluoroethylene (TFE).

The monomers of the first group may be used singly or in combinations of two or more.

The monomer of the second group is not particularly limited and is, for example, a vinyl compound having a functional group that can be converted into a sulfonic acid-type ion exchange group.

The vinyl compound having a functional group that can be converted into a sulfonic acid-type ion exchange group is preferably a compound represented by the following general formula (2):

$$CF_2=CF-(OCF_2CYF)_a-O-(CF_2)_b-SO_2F \qquad (2)$$

wherein a represents an integer of 0 to 2, b represents an integer of 1 to 4, and Y represents —F or —CF$_3$.

In formula (2), when a is 2, a plurality of Y are mutually independent.

The monomer of the second group is not particularly limited, and examples include monomers shown below:

$CF_2=CFOCF_2CF_2SO_2F$,
$CF_2=CFOCF_2CF(CF_3)OCF_2CF_2SO_2F$,
$CF_2=CFOCF_2CF(CF_3)OCF_2CF_2CF_2SO_2F$,
$CF_2=CF(CF_2)_2SO_2F$,
$CF_2=CFO[CF_2CF(CF_3)O]_2CF_2CF_2SO_2F$, and
$CF_2=CFOCF_2CF(CF_2OCF_3)OCF_2CF_2SO_2F$.

Among these, $CF_2=CFOCF_2CF(CF_3)OCF_2CF_2SO_2F$ and $CF_2=CFOCF_2CF(CF_3)OCF_2CF_2SO_2F$ are preferable.

The monomers of the second group may be used singly or in combinations of two or more.

The variety of combinations of monomers constituting the polymer A, and their ratio, degree of polymerization, and the like are not particularly limited. The polymer A contained in the layer A may be a single polymer or a combination of two or more. The ion exchange capacity of the fluorine-containing polymer A having a sulfonic acid group can be adjusted by changing the ratio of monomers represented by the above general formulae (1) and (2).

The layer A may be a single layer, or may be composed of two or more layers, according to the composition of the constituting polymer A.

When the layer A is a single layer, the thickness thereof is preferably 50 μm or more and 180 μm or less, and more preferably 80 μm or more and 160 μm or less. When the thickness of the layer A is within the above range, the strength of the membrane body tends to be more increased.

In the present specification, when the layer A has a two-layer structure, the layer on the side that is brought into contact with the anode is a layer A-1, and the layer on the side that is brought into contact with the layer B is a fluorine-containing polymer layer A-2. Here, it is preferable that the fluorine-containing polymer that forms the layer A-1 (also referred to as a "fluorine-containing polymer A-1") and the fluorine-containing polymer that forms the layer A-2 (also referred to as a "fluorine-containing polymer A-2") have different compositions. The thickness of the layer A-1 is preferably 10 μm or more and 60 μm or less. The thickness of the layer A-2 is preferably 30 μm or more and 120 μm or less, and more preferably 40 μm or more and 100 μm or less. When the thicknesses of the layer A-1 and the layer A-2 are within the above ranges, the strength of the membrane body can be sufficiently maintained. The total thickness of the layer A-1 and the layer A-2 is preferably 50 μm or more and 180 μm or less, and more preferably 80 μm or more and 160 μm or less. When the layer A is composed of two or more layers, the layer A may be formed by laminating two or more films that are composed of polymers A having different compositions.

[Layer B]

The layer B contained in the ion exchange membrane of the present embodiment contains a fluorine-containing polymer B having a carboxylic acid group (hereinafter sometimes simply referred to as a "polymer B"). Here, "the fluorine-containing polymer having a carboxylic acid group" refers to a fluorine-containing polymer having a carboxylic acid group or a carboxylic acid group precursor that can become a carboxylic acid group by hydrolysis. The layer B may contain a component other than the polymer B in a range of less than 10% by mass based on 100% by mass of the layer B, preferably contains the polymer B in an amount of 90% by mass or more based on 100% by mass of the layer B, and particularly preferably contains the polymer B in an amount of 100% by mass. Examples of the component that may be contained in the layer B other than the polymer B include, but are not limited to, metal chlorides such as potassium chloride.

The fluorine-containing polymer having a carboxylic acid group, which constitutes the layer B, can be produced by, for example, copolymerizing a monomer of the above first group and a monomer of a third group below, or homopolymerizing a monomer of the third group. In the case of being a copolymer, the polymer B may be a block copolymer or may be a random polymer.

The monomer of the third group is not particularly limited and is, for example, a vinyl compound having a functional group that can be converted into a carboxylic acid-type ion exchange group.

The vinyl compound having a functional group that can be converted into a carboxylic acid-type ion exchange group is preferably a compound represented by the following general formula (3):

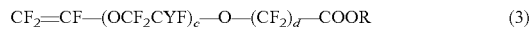

$$CF_2=CF-(OCF_2CYF)_c-O-(CF_2)_d-COOR \qquad (3)$$

wherein c represents an integer of 0 to 2, d represents an integer of 1 to 4, Y represents —F or —$CF_3$, and R represents —$CH_3$, —$C_2H_5$, or —$C_3H_7$.

In general formula (3), when c is 2, a plurality of Y are mutually independent. In the above general formula (3), it is preferable that Y is —$CF_3$, and R is —$CH_3$.

In particular, when the ion exchange membrane of the present embodiment is used as an ion exchange membrane for alkali electrolysis, it is preferable to use a perfluoro monomer as a monomer of at least the third group. Note that the alkyl group (see R above) in the ester group is lost from the polymer upon hydrolysis, and thus the alkyl group (R) does not need to be a perfluoroalkyl group. Among these, while the monomer of the third group is not particularly limited, for example, monomers shown below are more preferable:

$CF_2=CFOCF_2CF(CF_3)OCF_2COOCH_3$,
$CF_2=CFOCF_2CF(CF_3)O(CF_2)_2COOCH_3$,
$CF_2=CF[OCF_2CF(CF_3)]_2O(CF_2)_2COOCH_3$,
$CF_2=CFOCF_2CF(CF_3)O(CF_2)_3COOCH_3$,
$CF_2=CFO(CF_2)_2COOCH_3$, and
$CF_2=CFO(CF_2)_3COOCH_3$.

The monomers of the third group may be used singly or in combinations of two or more.

The variety of combinations of monomers constituting the polymer B, and their ratio, degree of polymerization, and the like are not particularly limited. The polymer B contained in the layer A may be a single component or a combination of two or more. The ion exchange capacity of the fluorine-containing polymer B having a carboxylic acid group can be adjusted by changing the ratio of the monomers represented by the above general formulae (3) and (4).

The thickness of the layer B is preferably 5 μm or more and 50 μm or less, and more preferably 5 μm or more and 20 μm or less. When the thickness of the layer B is within this range, the electrolytic performance of the ion exchange membrane tend to be more improved, and, as a result, there is a tendency that a higher current efficiency and a lower voltage can be achieved. When the membrane thickness of the layer B is within the above range, clusters in the layer B are likely to shrink during electrolysis, and the value of [(the ion cluster diameter of the layer B after electrolysis)/(the ion cluster diameter of the layer B before electrolysis)] is likely to be small.

In the ion exchange membrane of the present embodiment, from the viewpoint of further improving electrolytic performance and strength, it is preferable that the layer A contains a polymer of a compound represented by the above formula (2), and the layer B contains a polymer of a compound represented by the above formula (3).

In the ion exchange membrane of the present embodiment, the sum of the thickness of the layer A and the thickness of the layer B before electrolysis is preferably 55 μm or more, more preferably 55 μm or more and 210 μm or less, and even more preferably 85 μm or more and 190 μm or less. When the total thickness of the layer A and the layer B is within the above range, the strength of the membrane body tends to be more improved. From the same viewpoint, it is preferable that the thickness of the layer A before electrolysis is 50 to 180 μm, and the thickness of the layer B before electrolysis is 5 to 30 μm. Here, the thicknesses of the layer A and the layer B mean the thicknesses of the layer A and the layer B constituting the ion exchange membrane after a hydrolysis step, which will be described below, and before the above-described electrolysis, and can be measured by the method described in Examples. The thicknesses can be controlled by, for example, adjusting the extruder capacity and the rate of film take-up in a film forming step, which will be described below.

[Ratio of Ion Cluster Diameters Before and after Electrolysis]

Ion clusters are present in the ion exchange membrane of the present embodiment in a hydrated state. The ion cluster refers to a space where ions travel and is formed by association of ion exchange groups. The ion cluster diameter varies according to the degree of association of ion exchange groups and the water content of the membrane body, and can be controlled by the ion exchange capacities of fluorine-containing polymers and hydrolysis conditions, and, moreover, supplying electric power may cause the cluster diameter to vary. Due to the ratio of ion cluster diameters before and after electrolysis being within a predetermined range, the ion exchange membrane of the present embodiment has both excellent membrane strength and excellent electrolytic performance.

As for the ion exchange membrane of the present embodiment, when electrolysis is performed under the electrolytic conditions (1), [(the ion cluster diameter of the layer B after electrolysis)/(the ion cluster diameter of the layer B before electrolysis)] is 0.83 to 0.95, preferably 0.83 to 0.92, and more preferably 0.83 to 0.90. Here, the electrolysis conditions (1) means that the ion exchange membrane is disposed between an anode chamber and a cathode chamber, a 3.5 N aqueous sodium chloride solution is supplied to the anode chamber, a 10.8 N aqueous sodium hydroxide solution is supplied to the cathode chamber, and electrolysis is performed for 7 days under conditions having an electrolysis temperature of 85° C. and a current density of 6 kA/m². Here, "the ion cluster diameter of the layer B before electrolysis" refers to the ion cluster diameter of the layer B in the ion exchange membrane after the hydrolysis step in the production of the ion exchange membrane, which will be described below, and before being used in electrolysis. "The ion cluster diameter of the layer B after electrolysis" refers to the ion cluster diameter of the layer B in the ion exchange membrane after electrolysis is performed under the electrolytic condition (1). In the present specification, [(the ion cluster diameter of the layer B after electrolysis)/(the ion cluster diameter of the layer B before electrolysis)] may be simply referred to as "the ratio of the ion cluster diameters of the layer B before and after electrolysis".

When the ratio of the ion cluster diameters of the layer B before and after electrolysis is 0.83 or more, an increase of voltage during electrolysis is suppressed, and deterioration of electrolytic performance can be suppressed. The reason therefor is considered to be, although there is no intention to limit it to, that the ion cluster diameter of the layer B before electrolysis is not excessive, and a substantial increase of thickness due to an increased water content of the ion exchange membrane can be suppressed. When the ratio of the ion cluster diameters of the layer B before and after electrolysis is 0.95 or less, the ion selectivity during electrolysis is good. The reason therefor is considered to be, although there is no intention to limit it to, that the ion cluster diameter of the layer B during electrolysis shrinks to an optimum size. From these viewpoints, the ratio of the ion cluster diameters of the layer B before and after electrolysis is 0.83 to 0.95. The ratio of the ion cluster diameters of the layer B before and after electrolysis can be controlled to the above range in such a manner that, for example, the ratio is lowered by increasing the ion cluster diameter of the layer B before supplying electric power and reducing the ion cluster diameter of the layer B after supplying electric power. Specifically, for example, by increasing the treatment temperature of a salt exchange treatment, which will be described below, or extending the treatment time, the ion cluster diameter of the layer B before supplying electric power tends to be increased.

[Ion Cluster Diameter]

Before electrolysis, the ion cluster diameter of the layer A in the ion exchange membrane of the present embodiment is preferably 3.0 to 4.5 nm, more preferably 3.2 to 4.0 nm, and even more preferably 3.4 to 3.8 nm. In the ion exchange membrane before electrolysis, the ion cluster diameter of the layer B is preferably 2.5 to 4.0 nm, more preferably 3.0 to 3.8 nm, and even more preferably 3.2 to 3.6 nm. When the layer A is composed of two or more layers having different compositions, the ion cluster diameter is defined as the average of their ion cluster diameters. For example, when the layer A consists of two layers, i.e., layer A-1 and layer A-2, the average value of the ion cluster diameters of the layer A-1 and the layer A-2 is preferably 3.0 to 4.5 nm. When the ion cluster diameters of the layer A and the layer B in the ion exchange membrane before electrolysis are within the above ranges, there is a tendency that the electrolytic performance and strength of the ion exchange membrane are more improved. That is to say, when the cluster diameters are greater than the lower limits of the above ranges, there is a tendency that strength is more improved, and when the cluster diameters are smaller than the upper limits of the above ranges, there is a tendency that an increase of voltage can be more suppressed. The ion cluster diameters are measured by small angle X-ray scattering (SAXS) after peeling the layer A and the layer B into single-layer membranes consisting solely of the respective layers and impregnating the resulting films of the layer A and the layer B with water at 25° C. When the ion exchange membrane has coating layers, SAXS measurement can be performed in the same manner as above except that the coating layers are removed with a brush, and then the ion exchange membrane is separated into single-layer membranes consisting solely of the respective layers. Details will be described in Examples below.

As for the ion exchange membrane of the present embodiment, the ion cluster diameter of the layer B after electrolysis under the above electrolysis conditions (1) is preferably 2.0 to 3.3 nm, and more preferably 2.5 to 3.2 nm. Moreover, as for the ion exchange membrane of the present embodiment, from the viewpoint of further improving electrolytic performance and strength, it is particularly preferable that the ion cluster diameter of the layer B before electrolysis is 2.5 to 4.0 nm, and the ion cluster diameter of the layer B after electrolysis is 2.0 to 3.3 nm.

[Ion Exchange Capacity]

In the ion exchange membrane of the present embodiment, the ion exchange capacities of the fluorine-containing polymers constituting the layer A and the layer B are one of the factors that control the ion cluster diameters. The ion exchange capacity of a fluorine-containing polymer refers to the equivalent of an exchange group per gram of dried resin and can be measured by neutralization titration. The ion exchange capacity of the fluorine-containing polymer A constituting the layer A is preferably 0.8 to 1.2 mEq/g and more preferably 0.9 to 1.1 mEq/g. The ion exchange capacity of the fluorine-containing polymer B constituting the layer B is preferably 0.75 mEq/g or more, and more preferably 0.81 to 0.98 mEq/g. When the ion exchange capacities of the fluorine-containing polymers are within the above ranges, there is a tendency that a decrease of the electrolytic performance and strength of the ion exchange membrane is more effectively suppressed. Due to the ion exchange capacity of the fluorine-containing polymer B constituting the layer B being 0.81 or more, the water content in the ion exchange membrane is high, and thus clusters are likely to shrink upon electrolysis. There is a tendency that the larger the ion exchange capacity of each layer is, the larger the ion cluster diameter of the layer is, and the smaller the ion exchange capacity is, the smaller the ion cluster diameter is. The ion exchange capacity of each layer can be controlled by, for example, selection of a monomer that constitutes the fluorine-containing polymer contained in the layer and the content of the monomer. Specifically, for example, it can be controlled by the ratios of monomers of the above general formulae (1) to (3) introduced, and, more specifically, there is a tendency that the larger the contents of monomers containing ion exchange groups, which are represented by general formulae (2) and (3), are, the larger the ion exchange capacities are.

[Reinforcement Core Material]

The ion exchange membrane of the present embodiment preferably contains the reinforcement core materials 3 within the membrane. It is preferable that the reinforcement core material is capable of reinforcing the strength and dimensional stability of the ion exchange membrane and is present inside the membrane body. The reinforcement core material is preferably a woven fabric or the like obtained by weaving a reinforcement yarn. Since long-term heat resistance and chemical resistance are necessary, the component of the reinforcement core material is preferably a fiber consisting of a fluorine polymer. The component of the reinforcement core material is not particularly limited, and examples include polytetrafluoroethylene (PTFE), a tetrafluoroethylene-perfluoroalkyl vinyl ether copolymer (PFA), a tetrafluoroethylene-ethylene copolymer (ETFE), a tetrafluoroethylene-hexafluoropropylene copolymer, a trifluorochlorethylene-ethylene copolymer, and a vinylidene fluoride polymer (PVDF). In particular, a fiber consisting of polytetrafluoroethylene is preferably used.

The yarn diameter of the reinforcement core material is preferably 20 to 300 deniers and more preferably 50 to 250 deniers, and the weaving density (the fabric count per unit length) is preferably 5 to 50 counts/inch. The form of the reinforcement core material is woven fabric, non-woven fabric, a knitted fabric, or the like, and the woven fabric form is preferable. The thickness of the woven fabric is preferably 30 to 250 μm, and more preferably 30 to 150 μm.

For the woven fabric or the knitted fabric, examples of the material include, but not limited to, a monofilament, a multifilament, or a yarn or slit yarn thereof, and as for the weaving method, various weaving methods such as plain weave, leno weave, knitted weave, cord weave, and seersucker are used.

The aperture ratio of the reinforcement core material is not particularly limited, and is preferably 30% or more, and more preferably 50% or more and 90% or less. The aperture ratio is preferably 30% or more from the viewpoint of the electrochemical properties of the ion exchange membrane, and 90% or less from the viewpoint of the mechanical strength of the membrane. The aperture ratio is the ratio of the total area (B) where a substance such as an ion can pass in the ion exchange membrane to the total surface area (A) of the ion exchange membrane, and is expressed as (B)/(A). (B) is the total area of regions in the ion exchange membrane where ions, an electrolytic solution, and the like are not blocked by the reinforcement core material, the reinforcement yarn, and the like contained in the ion exchange membrane. The method for measuring the aperture ratio is as follows. A surface image of the ion exchange membrane (a cation exchange membrane before a coating and the like are applied) is captured, and (B) is determined from the area of parts where the reinforcement core material is not present. Then, (A) is determined from the area of the surface image of the ion exchange membrane, and the aperture ratio is determined by dividing (B) by (A).

Among these various reinforcement core materials, a plain weave configuration with a weaving density of 10 to 50 counts/inch of, for example, a tape yarn obtained by slitting a high-strength porous PTFE sheet into a tape form or a highly oriented PTFE monofilament having a denier of 50 to 300, is particularly preferred, and such configuration having a thickness in the range of 50 to 100 μm, and an aperture ratio of 60% or more is further preferred.

Furthermore, in the membrane production step, an auxiliary fiber, which is normally called a sacrifice core material, may be contained in the woven fabric to prevent yarn slippage of the reinforcement core material. Due to the sacrifice core material being contained, the continuous holes 2a, 2b can be formed in the ion exchange membrane.

The sacrifice core material dissolves in the membrane production step or the electrolysis environment and is not particularly limited, and rayon, polyethylene terephthalate (PET), cellulose, polyamide, and the like are used. The amount of the sacrifice core material contained in this case is preferably 10 to 80% by mass, and more preferably 30 to 70% by mass, of the entire woven fabric or knitted fabric.

[Continuous Holes]

The ion exchange membrane of the present embodiment may have the continuous holes 2a, 2b within the membrane. In the present embodiment, the continuous hole refers to a hole that can be a flow channel for cations produced during electrolysis and for an electrolytic solution. Due to the continuous holes formed, there is a tendency that the mobility of alkali ions produced during electrolysis and an electrolytic solution is more improved. The shape of the continuous holes is not particularly limited, and, according to the production method described below, it can have the shape of a sacrifice core material used in the formation of continuous holes.

In the present embodiment, it is preferable that the continuous holes pass through the anode side (the layer A side) and the cathode side (the layer B side) of the reinforcement core material in an alternating manner. Due to such a structure, in a part where a continuous hole is formed on the cathode side of the reinforcement core material, cations (such as sodium ions) transported through the electrolytic solution with which the continuous hole is filled can flow into the cathode side of the reinforcement core material. As a result, the flow of cations is not blocked, and thus there is a tendency that the electrical resistance of the ion exchange membrane can be further reduced.

[Coating]

As necessary, the ion exchange membrane of the present embodiment may have the coating layers 6, 7 on the cathode side and the anode side, respectively, for preventing attachment of gas. The material constituting the coating layers is not particularly limited, and from the viewpoint of preventing attachment of gas, it is preferable that an inorganic substance is contained. The inorganic substance is not particularly limited, and examples include zirconium oxide and titanium oxide. The method for forming the coating layers is not particularly limited, and a known method can be used. An example is a method including applying, with a spray or the like, a fluid containing fine particles of an inorganic oxide dispersed in a binder polymer solution.

[Method for Producing Ion Exchange Membrane]

The ion exchange membrane according to the present embodiment is produced such that the ratio of the ion cluster diameters of the layer B containing a fluorine-containing polymer having a carboxylic acid group before and after electrolysis under the above electrolytic conditions (1) is controlled to the above range, and, accordingly, the ion exchange capacities of the fluorine-containing polymer A and the fluorine-containing polymer B, the hydrolysis conditions, and the like are adjusted. Below, the method for producing the ion exchange membrane of the present embodiment will now be described in detail.

The method for producing the ion exchange membrane of the present embodiment is not particularly limited, and preferable is a production method including:

1) a step of producing fluorine-containing polymers having ion exchange groups or ion exchange group precursors that can become ion exchange groups by hydrolysis (a polymer production step);

2) a step of obtaining a reinforcement core material woven with a sacrifice yarn (a reinforcement core material production step);

3) a step of forming the fluorine-containing polymers having ion exchange groups or ion exchange group precursors that can become ion exchange groups by hydrolysis, into a film (a film formation step);

4) a step of forming a composite membrane by embedding the reinforcement core material and the film (an embedding step); and 5) a step of hydrolyzing the composite membrane with an acid or an alkali (a hydrolysis step).

Here, the "ion exchange group" refers to a sulfonic acid group or a carboxylic acid group.

As for the ion exchange membrane of the present embodiment, the ratio of the ion cluster diameters of the layer B before and after electrolysis can be adjusted by, for example, controlling the ion exchange capacities of the fluorine-containing polymers in the polymer production step 1) and/or controlling the hydrolysis conditions in the hydrolysis step 5) among the above steps. Hereinafter, each step will now be described.

Step 1) (Polymer Production Step)

The fluorine-containing polymer A having a sulfonic acid group, which constitutes the layer A, can be produced by, for example, copolymerizing a monomer of the first group and a monomer of the second group or homopolymerizing a monomer of the second group, as described above. The fluorine-containing polymer B having a carboxylic acid group, which constitutes the layer B, can be produced by, for example, copolymerizing a monomer of the first group and a monomer of the third group or homopolymerizing a monomer of the third group, as described above. The polymerization method is not particularly limited, and, for example, a polymerization method commonly used for polymerizing fluoroethylene, in particular tetrafluoroethylene, can be used.

The fluorine-containing polymers can be obtained by, for example, a non-aqueous method. In the non-aqueous method, a polymerization reaction can be performed, for example, using an inert solvent such as a perfluorohydrocarbon or chlorofluorocarbon in the presence of a radical polymerization initiator such as a perfluorocarbon peroxide or an azo compound under conditions having a temperature of 0 to 200° C. and a pressure of 0.1 to 20 MPa.

In the production of the fluorine-containing polymers, the variety of the combination of the above monomers and the proportions thereof are not particularly limited, and may be determined according to the kind, the amount, and the like of a functional group that is desired to be imparted to the resulting fluorine-containing polymers.

In the present embodiment, in order to control the ion exchange capacities of the fluorine-containing polymers, the ratio of the starting-material monomers mixed may be adjusted in the production of the fluorine-containing polymers that form the respective layers.

The fluorine-containing polymer A having a sulfonic acid group, which constitutes the layer A, is preferably produced by, for example, polymerizing a monomer represented by the above general formula (2) or copolymerizing a monomer represented by the above general formula (1) and a monomer represented by the above general formula (2) in the following molar ratio.

Monomer represented by the above general formula (1): Monomer represented by the above general formula (2)=4:1 to 7:1

The fluorine-containing polymer B having a carboxylic acid group, which constitutes the layer B, is preferably produced by, for example, polymerizing a monomer represented by the above general formula (3) or copolymerizing a monomer represented by the above general formula (1) and a monomer represented by the above general formula (3) in the following molar ratio.

Monomer represented by the above general formula (1): Monomer represented by the above general formula (3)=6:1 to 9:1

Step 2) (Reinforcement Core Material Production Step)

From the viewpoint of further improving membrane strength, a reinforcement core material is preferably embedded in the ion exchange membrane of the present embodiment. In the case of an ion exchange membrane having continuous holes, a sacrifice yarn is also woven into the reinforcement core material. The amount of the sacrifice yarn contained in this case is preferably 10 to 80% by mass and more preferably 30 to 70% by mass of the entire reinforcement core material. It is also preferable that the sacrifice yarn is a monofilament or a multifilament having a thickness of 20 to 50 deniers and consisting of polyvinyl alcohol or the like.

Step 3) (Film Formation Step)

The method for forming the fluorine-containing polymers obtained in step 1) into films is not particularly limited, and it is preferable to use an extruder. Examples of the film forming method are as follows.

When the layer A and the layer B constitute respective single layers, an example is a method including separately forming the fluorine-containing polymer A and the fluorine-containing polymer B into films.

When the layer A has a two-layer structure consisting of layer A-1 and layer A-2, examples include a method including forming the fluorine-containing polymer A-2 and the fluorine-containing polymer B into a composite film by coextrusion, and, separately, forming the fluorine-containing polymer A-1 into a film independently; and a method including forming the fluorine-containing polymer A-1 and the fluorine-containing polymer A-2 into a composite film by coextrusion, and, separately, forming the fluorine-containing polymer B into a film independently. Among these, coextrusion of the fluorine-containing polymer A-2 and the fluorine-containing polymer B contributes to increasing interfacial adhesive strength, and is thus preferable.

Step 4) (Embedding Step)

In the embedding step, it is preferable that the reinforcement core material obtained in step 2) and the films obtained in step 3) are embedded on a heated drum. The reinforcement core material and the films are integrated into a single body by being embedded on the drum via a gas permeable, heat resistant release paper while removing air between the layers by reduced pressure under a temperature at which the fluorine-containing polymers constituting the respective layers melt, and thus a composite film is obtained. The drum is not particularly limited, and, for example, is a drum that has a heat source and a vacuum source, and the surface of which has a large number of microporous pores.

As for the order of laminating the reinforcement core material and the films, examples include the following methods depending on step 3).

When the layer A and the layer B are respective single layers, an example is a method including laminating a release paper, the layer A film, the reinforcement core material, and the layer B film on the drum in this order.

When the layer A has a two-layer structure consisting of the layer A-1 and the layer A-2, one example is a method including laminating a release paper, the layer A film, the reinforcement core material, and a composite film of the layer A-2 and the layer B film on the drum in this order; and another example is a method including laminating a release paper, a composite film of the layer A-1 and the layer A-2, the reinforcement core material, and the layer B on the drum in this order.

In order to provide projections on the membrane surface of the ion exchange membrane of the present embodiment, the use of a release paper that has been embossed in advance makes it possible to form projections consisting of molten polymers during embedding.

Step 5) (Hydrolysis Step)

The composite membrane obtained in step 4) is hydrolyzed with an acid or an alkali. In this hydrolysis step, the ratio of the ion cluster diameters of the layer B before and after electrolysis can be controlled by changing hydrolysis conditions such as solution composition, hydrolysis temperature, and time. In the production of the ion exchange membrane according to the present embodiment, it is preferable to perform hydrolysis, for example, at 40 to 90° C. for 10 minutes to 24 hours in an aqueous solution of 2.5 to 4.0 N potassium hydroxide (KOH) and 20 to 40% by mass of dimethyl sulfoxide (DMSO). Thereafter, it is preferable to perform a salt exchange treatment under 50 to 95° C. conditions using a 0.5 to 0.7 N caustic soda (NaOH) solution. From the viewpoint of more effectively preventing a voltage increase resulting from an excessive increase of the layer thickness, the treatment time is preferably shorter than 2 hours when the treatment temperature in the salt exchange treatment is 70° C. or higher.

The ion cluster diameter can be controlled by changing the composition of the fluid employed in the hydrolysis step, the hydrolysis temperature, the hydrolysis time, and the like. For example, a large ion cluster diameter can be achieved by lowering the KOH concentration, increasing the DMSO concentration, increasing the hydrolysis temperature, or extending the hydrolysis time. By controlling the ion cluster diameter of each layer, the ratio of the ion cluster diameters of the layer B before and after electrolysis can also be controlled, and it is also possible to make the cluster diameter of the layer B after electrolysis significantly smaller than that before electrolysis. Specifically, for example, controlling the ion cluster diameter of the layer B before electrolysis to be large results in a small ratio of the ion cluster diameters of the layer B before and after electrolysis. Coating layers may be provided on the surface of the hydrolyzed membrane.

[Electrolytic Cell]

Figure 2:
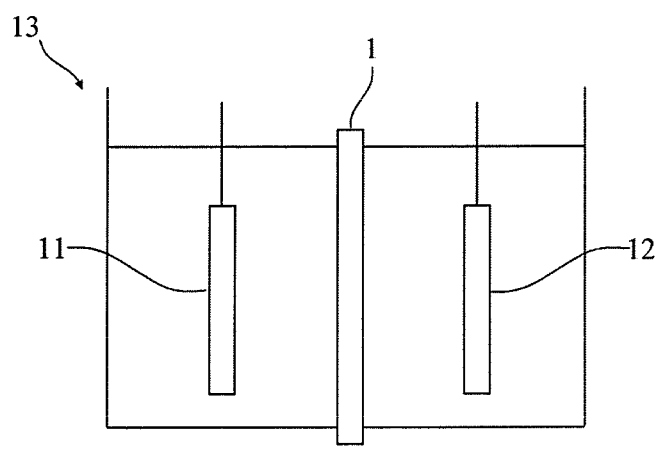
FIG. 2 is a schematic view of one example of an electrolytic cell of the present embodiment.

The electrolytic cell of the present embodiment includes the ion exchange membrane of the present embodiment. FIG. 2 shows a schematic view of one example of the electrolytic cell of the present embodiment. The electrolytic cell 13 includes at least an anode 11, a cathode 12, and the ion exchange membrane 1 of the present embodiment disposed between the anode and the cathode. While the electrolytic cell is usable in various types of electrolysis, a case where it is used in the electrolysis of an aqueous alkali chloride solution will now be described below as a representative example.

The electrolytic conditions are not particularly limited, and electrolysis can be performed under known conditions. For example, a 2.5 to 5.5 N aqueous alkali chloride solution is supplied to the anode chamber, water or a diluted aqueous alkali hydroxide solution is supplied to the cathode chamber, and electrolysis can be performed under conditions having an electrolysis temperature of 50 to 120° C. and a current density of 0.5 to 10 kA/m$^2$.

The configuration of the electrolytic cell of the present embodiment is not particularly limited, and may be, for example, unipolar or bipolar. Materials constituting the electrolytic cell are not particularly limited, and, for example, the material of the anode chamber is preferably titanium or the like that is resistant to alkali chloride and chlorine, and the material of the cathode chamber is preferably nickel or the like that is resistant to alkali hydroxide and hydrogen. As for the arrangement of electrodes, the ion exchange membrane and the anode may be disposed with a suitable space provided therebetween, or the anode and the ion exchange membrane may be disposed to be in contact. While the cathode is generally disposed so as to have a suitable space from the ion exchange membrane, a contact-type electrolytic cell that does not have this space (a zero-gap base electrolytic cell) may be adopted.

EXAMPLES

Below, the present embodiment will now be described in detail by way of Examples. The present embodiment is not limited to the following Examples.

The measurement methods in Examples and Comparative Examples are as follows.

[Method for Measuring Ion Cluster Diameter]

The ion cluster diameter was measured by small angle X-ray scattering (SAXS). As for SAXS measurement, when the ion exchange membrane had coating layers, the coating layers were removed with a brush, then the layer A and the layer B were peeled off, and single-layer membranes each composed solely of either layer were impregnated with water and measured at 25° C. In SAXS measurement, a SAXS apparatus Nano Viewer manufactured by Rigaku Corporation was used. Measurement was performed using a PILATUS 100K as a detector with a sample-detector distance of 841 mm for a small-angle area, and using an imaging plate as a detector with a sample-detector distance of 75 mm for a wide-angle area, and both profiles were combined to obtain scattering data at a scattering angle in the range of 0.1°<scattering angle (2θ)<30°. Measurement was performed with 7 samples being placed one on top of the other, and the exposure time was 15 minutes for both small-angle area and wide-angle area measurements. When data was acquired with a two-dimensional detector, data was converted to one-dimensional data by a reasonable process such as circular averaging. Correction of error derived from the detector such as dark current and correction of scattering due to substances other than the sample (empty cell scattering corrections) were made on the obtained SAXS profile. When the influence of the X-ray beam shape (the influence of smear) on the SAXS profile was large, corrections (desmear) were also made on the X-ray beam shape. As for the one-dimensional SAXS profile obtained in this way, the ion cluster diameter was determined in accordance with the technique described by Yasuhiro Hashimoto, Naoki Sakamoto, Hideki Iijima, *Kobunshi Ronbunshu* (*Japanese Journal of Polymer Science and Technology*) vol. 63, No. 3, p. 166, 2006. That is to say, assuming that the ion cluster structure was represented by a core-shell type hard sphere having a particle size distribution, and using a theoretical scattering formula that is based on this model, fitting was performed in reference to the SAXS profile of a scattering angle region where scattering derived from ion clusters is dominant in the actually measured SAXS profile, to thereby determine the average cluster diameter (the ion cluster diameter) and the ion cluster number density. In this model, the core part was regarded as corresponding to the ion cluster, and the core diameter was regarded as corresponding to the ion cluster diameter. The shell layer was imaginary, and the electron density of the shell layer was regarded as being the same as that of the matrix part. Also, the shell layer thickness here was regarded as being 0.25 nm. The theoretical scattering formula of the model used for fitting is presented below as formula (A). Also, the fitting range was 1.4<2θ<6.7°.

$$I_{HS}(q) = CNS(q, a_2, \eta) \int_0^\infty P(a)[V(a)\Phi(qa)]^2 da + I_b(q) \quad \text{formula (A)}$$

wherein $$q = 4\pi \sin\theta/\lambda$$

$$S(q, a_2, \eta) = \frac{1}{1 + 24\eta[G(A)/A]}$$

$$G(A) = \frac{\alpha}{A^2}(\sin A - A\cos A) +$$

$$\frac{\beta}{A^3}[2A\sin A + (2 - A^2)\cos A - 2] + \frac{\gamma}{A^5}$$

$$(-A^4\cos A + 4[(3A^2 - 6)\cos A + (A^3 - 6A)\sin A + 6])$$

$$\alpha = (1 + 2\eta)^2/(1 - \eta)^4$$

$$\beta = -6\eta(1 + \eta/2)^2/(1 - \eta)^4$$

$$\gamma = 1/2\eta(1 + 2\eta)^2/(1 - \eta)^4$$

-continued $$A = 2qa_2$$

$$a_2 = a_0 + t$$

$$V(a) = \frac{4}{3}\pi a^3$$

$$\Phi(qa) = \frac{3}{(qa)^3}[\sin(qa) - (qa)\cos(qa)]$$

$$P(a) = \frac{p(a)/V(a)}{\int p(a)/V(a)da}$$

$$p(a) = \frac{M^M}{\Gamma(M)a_0^M} a^{M-1} \exp\left(-\frac{M}{a_0}a\right)$$

$$M = \left(\frac{\sigma}{a_0}\right)^{-2}$$

Above, C represents a constant; N represents a cluster number density; η represents the volume fraction of a hard sphere, assuming that the core, i.e., the ion cluster part, and the surrounding imaginary shell constitute a hard sphere; θ represents a Bragg angle; λ represents an X ray wavelength used; t represents a shell layer thickness; $a_0$ represents an average ion cluster radius, Γ(x) represents a gamma function; and σ represents the standard deviation of the ion cluster radius (the core radius). P(a) represents the distribution function of core radius a, where the volume distribution of a follows Schultz-Zimm distribution p(a). M is a parameter representing distribution. Ib(q) represents background scattering including scattering derived from excessive water during measurement and thermal diffuse scattering, and is assumed as a constant here. Among the parameters above, N, η, $a_0$, σ, and Ib(q) are variable parameters in fitting. In this specification, the ion cluster diameter means the average diameter of ion clusters ($2a_0$).

[Method for Measuring Thickness of Each Layer after Hydrolysis Step]

The ion exchange membrane after the hydrolysis step and before electrolysis was cut in the cross-sectional direction from the layer A-1 side or the layer B side to obtain a portion with a width of about 100 μm, and the thickness was actually measured in a hydrated state using an optical microscope, with the cross section facing upward. At this time, the portion that was cut out was an intermediate part (a valley part) between adjacent reinforcement core materials, the portion measured on the obtained cross-sectional view, in reference to FIG. 1, is an intermediate part between adjacent reinforcement core materials 3, and the thicknesses of the layer A and the layer B were measured, with the direction from (α) toward (β) being regarded as the thickness direction.

[Electrolytic Performance Evaluation]

The electrolytic cells used were zero-gap base electrolytic cells obtained by modifying the configuration of the electrolytic cell 13 shown in FIG. 2 as follows. That is to say, provided were electrolytic cells obtained by modifying the positional relationship of the ion exchange membrane 1 with respect to the anode 11 and the cathode 12 in the electrolytic cell 13 to attain a state where the ion exchange membrane 1 and the anode 11 were in contact and a state where the ion exchange membrane 1 and the cathode 12 were in contact (i.e., a "zero-gap" state). Using these zero-gap base electrolytic cells, electrolysis was performed under the following conditions to evaluate electrolytic performance based on the electrolytic voltage, current efficiency, and amount of sodium chloride in the produced caustic soda. A case where the ion exchange membrane was in contact with the entire electrode surfaces of the cathode and the anode as well as a case where the ion exchange membrane was in contact with certain points of the electrode surfaces were both regarded as a zero-gap state.

Brine was supplied to the anode side while adjusting the sodium chloride concentration to be 3.5 N, and water was supplied while maintaining the caustic soda concentration on the cathode side at 10.8 N. The temperature of brine was set to 85° C., and electrolysis was performed under conditions where the current density was 6 kA/m², and the fluid pressure on the cathode side of the electrolytic cell was 5.3 kPa higher than the fluid pressure on the anode side.

The concentration of sodium chloride contained in caustic soda at day 7 of electrolysis was measured by the method of JIS K 1200-3-1. Nitric acid was added to electrolytically produced caustic soda for neutralization, and an iron(III) sulfate ammonium solution and mercury(II) thiocyanate were added to cause the solution to develop color. The solution was absorptiometrically analyzed with a UV meter to measure the sodium chloride concentration in caustic soda, and the measured value at day 7 was determined as the sodium chloride concentration in caustic soda. The UV meter used was a V-630 spectrophotometer manufactured by JASCO.

The current efficiency was determined by measuring the mass and concentration of the produced caustic soda and dividing the amount by mole of caustic soda produced in a specific time by the amount by mole of electrons that flowed during that time.

[Strength Test]

As a strength test, tensile strength and tensile elongation were measured in accordance with JIS K 6732 using the ion exchange membrane after hydrolysis (before electrolysis).

Example 1

As a fluorine-containing polymer A-1, a monomer represented by the following general formula (1) ($X_1$=F, $X_2$=F) and a monomer represented by the following general formula (2) (a=1, b=2, Y=$CF_3$) were copolymerized in a molar ratio of 5:1 to give a polymer having an ion exchange capacity of 1.05 mEq/g. The ion exchange capacity was determined by neutralization titration. The ion exchange capacity was determined in the same manner in the following Examples and Comparative Examples.

$$CF_2=CX_1X_2 \quad (1)$$

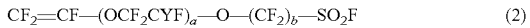

$$CF_2=CF-(OCF_2CYF)_a-O-(CF_2)_b-SO_2F \quad (2)$$

As a fluorine-containing polymer A-2, a monomer represented by the above general formula (1) ($X_1$=F, $X_2$=F) and a monomer represented by the above general formula (2) (a=1, b=2, Y=$CF_3$) were copolymerized in a molar ratio of 5.7:1 to give a polymer having an ion exchange capacity of 0.99 mEq/g.

As a fluorine-containing polymer B for forming the layer B, a monomer represented by the above general formula (1) ($X_1$=F, $X_2$=F) and a monomer represented by the following general formula (3) (c=1, d=2, Y=$CF_3$, R=$CH_3$) were copolymerized in a molar ratio of 7.5:1 to give a polymer having an ion exchange capacity of 0.89 mEq/g.

$$CF_2=CF-(OCF_2CYF)_c-O-(CF_2)_d-COOR \quad (3)$$

More specifically, the fluorine-containing polymers A (A-1, A-2) were prepared by solution polymerization as presented below.

First, $CF_2$=$CFOCF_2CF(CF_3)O(CF_2)_2COOCH_3$ and an HFC-43-10mee solution were introduced into a 20 L stainless steel autoclave, and the vessel was fully replaced with nitrogen, then further replaced with $CF_2$=$CF_2$ (TFE), heated until the temperature inside the vessel became stable at 35° C., and pressurized by TFE.

Then, a 5% HFC43-10mee solution of $(CF_3CF_2CF_2COO)_2$ as a polymerization initiator was introduced to initiate the reaction. At this time, methanol was added as a chain transfer agent. TFE was intermittently fed while stirring at 35° C., methanol was added to lower the TFE pressure during the process, and polymerization was terminated when a predetermined amount of TFE was supplied. After unreacted TFE was discharged to the outside of the system, methanol was added to the resulting polymerization solution to aggregate and separate the fluorine-containing polymer. Further, after drying, the polymer A was obtained. The resulting fluorine-containing polymer was pelletized with a biaxial extruder.

The fluorine-containing polymer B was obtained by the same method as the polymer A except that $CF_2$=$CFOCF_2CF(CF_3)O(CF_2)_2SO_2F$ was introduced in place of $CF_2$=$CFOCF_2CF(CF_3)O(CF_2)_2COOCH_3$, no chain transfer agent was used, and a 5% HFC43-10mee solution of $(CF_3CF_2CF_2COO)_2$ was added in place of methanol during the process. Pellets of the fluorine-containing polymers A and B were also obtained in the same manner in the following Examples and Comparative Examples.

The resulting fluorine polymer A-2 and fluorine polymer B were coextruded with an apparatus equipped with 2 extruders, a coextrusion T die for 2 layers, and a take-up machine, to give a two-layer film (a1) having a thickness of 93 μm. As a result of observing the cross section of the film (a1) under an optical microscope, the thickness of the layer A-2 was 80 μm, and the thickness of the layer B was 13 μm. The layer A-2 and the layer B were distinguished by applying polarization. A single-layer film (b1) having a thickness of 20 μm for the layer A-1 was obtained with a single-layer T die.

On a drum having a heat source and a vacuum source inside and having a large number of microporous pores in the surface, an air-permeable, heat-resistant release paper, the single-layer film (b1), a reinforcement core material, and the two-layer film (a1) were laminated in this order and integrated into a single body while eliminating air between the materials at a temperature of 230° C. under a reduced pressure of −650 mmHg to give a composite membrane.

A 100-denier polytetrafluoroethylene (PTFE) tape yarn twisted 900 times/m into a thread form as the reinforcement core material, a 30-denier, 6-filament polyethylene terephthalate (PET) twisted 200 times/m as a warp yarn of the auxiliary fiber (sacrifice yarn) and a 35-denier, 8-filament PET thread twisted 10 times/m as the weft yarn were provided, and these yarns were plain-woven in an alternate arrangement such that the PTFE yarn was 24 counts/inch and the sacrifice yarn was 4 times PTFE, i.e., 64 counts/inch, to give a woven fabric having a thickness of 100 μm. The resulting woven fabric was pressure-bonded with a heated metal roll to regulate the thickness of the woven fabric to 70 μm. At this time, the aperture ratio of the PTFE yarn alone was 75%.

This composite membrane was hydrolyzed at a temperature of 80° C. for 0.5 hours in an aqueous solution containing 30% by mass of DMSO and 4.0 N of KOH and then subjected to salt exchange treatment for 1 hour under 50° C. conditions using a 0.6 N NaOH solution.

A fluorine polymer having a sulfonic acid group, which had an ion exchange capacity of 1.0 mEq/g and were obtained by hydrolyzing a copolymer of $CF_2=CF_2$ and $CF_2=CFOCF_2CF(CF_3)O(CF_2)_3SO_2F$, was dissolved in a 50/50 parts by mass mixed solution of water and ethanol in an amount of 20% by mass. Zirconium oxide having a primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.91. Measurement results are shown in Table 1.

Example 2

As a fluorine-containing polymer A-1, a monomer represented by the above general formula (1) ($X_1=F$, $X_2=F$) and a monomer represented by the above general formula (2) (a=1, b=2, $Y=CF_3$) were copolymerized in a molar ratio of 5:1 to give a polymer having an ion exchange capacity of 1.05 mEq/g.

As a fluorine-containing polymer A-2, a monomer represented by the above general formula (1) and a monomer represented by the above general formula (2) (a=1, b=2, $Y=CF_3$) were copolymerized in a molar ratio of 5.7:1 to give a polymer having an ion exchange capacity of 0.99 mEq/g.

As a fluorine-containing polymer B for forming the layer B, a monomer represented by the above general formula (1) ($X_1=F$, $X_2=F$) and a monomer represented by the above general formula (3) (c=1, d=2, $Y=CF_3$, $R=CH_3$) were copolymerized in a molar ratio of 7.5:1 to give a polymer having an ion exchange capacity of 0.89 mEq/g.

The resulting fluorine polymer A-2 and fluorine polymer B were coextruded with an apparatus equipped with 2 extruders, a coextrusion T die for 2 layers, and a take-up machine, to give a two-layer film (a2) having a thickness of 93 μm. As a result of observing the cross section of the film under an optical microscope, the thickness of the layer A-2 was 80 μm, and the thickness of the layer B was 13 μm. A single-layer film (b2) having a thickness of 20 μm for the layer A-1 was obtained with a single-layer T die.

On a drum having a heat source and a vacuum source inside and having a large number of microporous pores in the surface, an air-permeable, heat-resistant release paper, the single-layer film (b2), a reinforcement core material, and the two-layer film (a2) were laminated in this order and integrated into a single body while eliminating air between the materials at a temperature of 230° C. under a reduced pressure of −650 mmHg to give a composite membrane. The same reinforcement core material as in Example 1 was used.

This composite membrane was hydrolyzed at a temperature of 50° C. for 24 hours in an aqueous solution containing 30% by mass of DMSO and 4.0 N of KOH and then subjected to salt exchange treatment for 0.5 hour under 90° C. conditions using a 0.6 N NaOH solution.

A fluorine polymer having a sulfonic acid group, which had an ion exchange capacity of 1.0 mEq/g and were obtained by hydrolyzing a copolymer of $CF_2=CF_2$ and $CF_2=CFOCF_2CF(CF_3)O(CF_2)_3SO_2F$, was dissolved in a 50/50 parts by mass mixed solution of water and ethanol in an amount of 20% by mass. Zirconium oxide having a primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.93. Measurement results are shown in Table 1.

Example 3

As a fluorine-containing polymer A-1, a monomer represented by the above general formula (1) ($X_1=F$, $X_2=F$) and a monomer represented by the above general formula (2) (a=1, b=2, $Y=CF_3$) were copolymerized in a molar ratio of 5:1 to give a polymer having an ion exchange capacity of 1.05 mEq/g.

As a fluorine-containing polymer A-2, a monomer represented by the above general formula (1) ($X_1=F$, $X_2=F$) and a monomer represented by the above general formula (2) (a=1, b=2, $Y=CF_3$) were copolymerized in a molar ratio of 5.7:1 to give a polymer having an ion exchange capacity of 0.99 mEq/g.

As a fluorine-containing polymer B for forming the fluorine-containing layer B, a monomer represented by the above general formula (1) ($X_1=F$, $X_2=F$) and a monomer represented by the above general formula (3) (c=1, d=2, $Y=CF_3$, $R=CH_3$) were copolymerized in a molar ratio of 7.3:1 to give a polymer having an ion exchange capacity of 0.91 mEq/g.

The fluorine polymer A-2 and the fluorine polymer B were coextruded with an apparatus equipped with 2 extruders, a coextrusion T die for 2 layers, and a take-up machine, to give a two-layer film (a3) having a thickness of 93 μm. As a result of observing the cross section of the film under an optical microscope, the thickness of the fluorine-containing layer A-2 was 80 μm, and the thickness of the fluorine-containing layer B was 13 μm. A single-layer film (b3) having a thickness of 20 μm for the fluorine-containing layer A-1 was obtained with a single-layer T die.

On a drum having a heat source and a vacuum source inside and having a large number of microporous pores in the surface, an air-permeable, heat-resistant release paper, the single-layer film (b3), a reinforcement core material, and the two-layer film (a3) were laminated in this order and integrated into a single body while eliminating air between the materials at a temperature of 230° C. under a reduced pressure of −650 mmHg to give a composite membrane. The same reinforcement core material as in Example 1 was used.

This composite membrane was hydrolyzed at a temperature of 50° C. for 24 hours in an aqueous solution containing 30% by mass of DMSO and 4.0 N of KOH and then subjected to salt exchange treatment for 1 hour under 95° C. conditions using a 0.6 N NaOH solution.

A fluorine polymer having a sulfonic acid group, which had an ion exchange capacity of 1.0 mEq/g and were obtained by hydrolyzing a copolymer of $CF_2=CF_2$ and $CF_2=CFOCF_2CF(CF_3)O(CF_2)_3SO_2F$, was dissolved in a 50/50 parts by mass mixed solution of water and ethanol in an amount of 20% by mass. Zirconium oxide having a primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.86. Measurement results are shown in Table 1.

Example 4

As a fluorine-containing polymer A-1, a monomer represented by the above general formula (1) ($X_1$=F, $X_2$=F) and a monomer represented by the above general formula (2) (a=1, b=2, Y=$CF_3$) were copolymerized in a molar ratio of 5:1 to give a polymer having an ion exchange capacity of 1.05 mEq/g.

As a fluorine-containing polymer A-2, a monomer represented by the above general formula (1) ($X_1$=F, $X_2$=F) and a monomer represented by the above general formula (2) (a=1, b=2, Y=$CF_3$) were copolymerized in a molar ratio of 6:1 to give a polymer having an ion exchange capacity of 0.95 mEq/g.

As a fluorine-containing polymer B for forming the fluorine-containing layer B, a monomer represented by the above general formula (1) ($X_1$=F, $X_2$=F) and a monomer represented by the above general formula (3) (c=1, d=2, Y=$CF_3$, R=$CH_3$) were copolymerized in a molar ratio of 8:1 to give a polymer having an ion exchange capacity of 0.85 mEq/g.

The fluorine polymer A-2 and the fluorine polymer B were coextruded with an apparatus equipped with 2 extruders, a coextrusion T die for 2 layers, and a take-up machine, to give a two-layer film (a4) having a thickness of 100 μm. As a result of observing the cross section of the film under an optical microscope, the thickness of the fluorine-containing layer A-2 was 85 μm, and the thickness of the fluorine-containing layer B was 15 μm. A single-layer film (b4) having a thickness of 25 μm for the fluorine-containing layer A-1 was obtained with a single-layer T die.

On a drum having a heat source and a vacuum source inside and having a large number of microporous pores in the surface, an air-permeable, heat-resistant release paper, the single-layer film (b4), a reinforcement core material, and the two-layer film (a4) were laminated in this order and integrated into a single body while eliminating air between the materials at a temperature of 230° C. under a reduced pressure of –650 mmHg to give a composite membrane. The same reinforcement core material as in Example 1 was used.

This composite membrane was hydrolyzed at a temperature of 80° C. for 0.5 hours in an aqueous solution containing 30% by mass of DMSO and 4.0 N of KOH and then subjected to salt exchange treatment for 1 hour under 50° C. conditions using a 0.6 N NaOH solution.

A fluorine polymer having a sulfonic acid group, which had an ion exchange capacity of 1.0 mEq/g and were obtained by hydrolyzing a copolymer of $CF_2$=$CF_2$ and $CF_2$=$CFOCF_2CF(CF_3)O(CF_2)_3SO_2F$, was dissolved in a 50/50 parts by mass mixed solution of water and ethanol in an amount of 20% by mass. Zirconium oxide having a primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.93. Measurement results are shown in Table 1.

Example 5

As a fluorine-containing polymer A-1, a monomer represented by the above general formula (1) ($X_1$=F, $X_2$=F) and a monomer represented by the above general formula (2) (a=1, b=2, Y=$CF_3$) were copolymerized in a molar ratio of 5:1 to give a polymer having an ion exchange capacity of 1.05 mEq/g.

As a fluorine-containing polymer A-2, a monomer represented by the above general formula (1) ($X_1$=F, $X_2$=F) and a monomer represented by the above general formula (2) (a=1, b=2, Y=$CF_3$) were copolymerized in a molar ratio of 5.7:1 to give a polymer having an ion exchange capacity of 0.99 mEq/g.

As a fluorine-containing polymer B for forming the layer B, a monomer represented by the above general formula (1) ($X_1$=F, $X_2$=F) and a monomer represented by the above general formula (3) (c=1, d=2, Y=$CF_3$, R=$CH_3$) were copolymerized in a molar ratio of 7.5:1 to give a polymer having an ion exchange capacity of 0.89 mEq/g.

The resulting fluorine polymer A-2 and fluorine polymer B were coextruded with an apparatus equipped with 2 extruders, a coextrusion T die for 2 layers, and a take-up machine, to give a two-layer film (a1) having a thickness of 93 μm. As a result of observing the cross section of the film (a1) under an optical microscope, the thickness of the layer A-2 was 80 μm, and the thickness of the layer B was 13 μm. The layer A-2 and the layer B were distinguished by applying polarization. A single-layer film (b1) having a thickness of 20 μm for the layer A-1 was obtained with a single-layer T die.

On a drum having a heat source and a vacuum source inside and having a large number of microporous pores in the surface, an air-permeable, heat-resistant release paper, the single-layer film (b1), a reinforcement core material, and the two-layer film (a1) were laminated in this order and integrated into a single body while eliminating air between the materials at a temperature of 230° C. under a reduced pressure of –650 mmHg to give a composite membrane.

As for the reinforcement core material, a 100-denier polytetrafluoroethylene (PTFE) tape yarn twisted 900 times/m into a thread form was plain-woven to have 24 threads/inch to give a woven fabric having a thickness of 100 μm. The resulting woven fabric was pressure-bonded with a heated metal roll to regulate the thickness of the woven fabric to 70 μm. At this time, the aperture ratio of the PTFE yarn alone was 75%.[0118]

This composite membrane was hydrolyzed at a temperature of 80° C. for 0.5 hours in an aqueous solution containing 30% by mass of DMSO and 4.0 N of KOH and then subjected to salt exchange treatment for 1 hour under 50° C. conditions using a 0.6 N NaOH solution.

A fluorine polymer having a sulfonic acid group, which had an ion exchange capacity of 1.0 mEq/g and were obtained by hydrolyzing a copolymer of $CF_2$=$CF_2$ and $CF_2$=$CFOCF_2CF(CF_3)O(CF_2)_3SO_2F$, was dissolved in a 50/50 parts by mass mixed solution of water and ethanol in an amount of 20% by mass. Zirconium oxide having a primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.95. Measurement results are shown in Table 1.

Comparative Example 1

As a fluorine-containing polymer A-1, a monomer represented by the above general formula (1) ($X_1$=F, $X_2$=F) and a monomer represented by the above general formula (2) (a=1, b=2, Y=$CF_3$) were copolymerized in a molar ratio of 5:1 to give a polymer having an ion exchange capacity of 1.05 mEq/g.

As a fluorine-containing polymer A-2, a monomer represented by the above general formula (1) ($X_1$=F, $X_2$=F) and a monomer represented by the above general formula (2) (a=1, b=2, Y=$CF_3$) were copolymerized in a molar ratio of 5.7:1 to give a polymer having an ion exchange capacity of 0.99 mEq/g.

As a fluorine-containing polymer B for forming the fluorine-containing layer B, a monomer represented by the above general formula (1) ($X_1$—F, $X_2$=F) and a monomer represented by the above general formula (3) (c=1, d=2, Y=$CF_3$, R=$CH_3$) were copolymerized in a molar ratio of 8.5:1 to give a polymer having an ion exchange capacity of 0.80 mEq/g.

The resulting fluorine polymer A-2 and fluorine polymer B were coextruded with an apparatus equipped with 2 extruders, a coextrusion T die for 2 layers, and a take-up machine, to give a two-layer film (a5) having a thickness of 93 μm. As a result of observing the cross section of the film under an optical microscope, the thickness of the layer A-2 was 80 μm, and the thickness of the layer B was 13 μm. A single-layer film (b5) having a thickness of 20 μm for the layer A-1 was obtained with a single-layer T die.

On a drum having a heat source and a vacuum source inside and having a large number of microporous pores in the surface, an air-permeable, heat-resistant release paper, the single-layer film (b5), a reinforcement core material, and the two-layer film (a5) were laminated in this order and integrated into a single body while eliminating air between the materials at a temperature of 230° C. under a reduced pressure of −650 mmHg to give a composite membrane. The same reinforcement core material as in Example 1 was used.

This composite membrane was hydrolyzed at a temperature of 80° C. for 0.5 hours in an aqueous solution containing 30% by mass of DMSO and 4.0 N of KOH and then subjected to salt exchange treatment for 1 hour under 50° C. conditions using a 0.6 N NaOH solution.

A fluorine polymer having a sulfonic acid group, which had an ion exchange capacity of 1.0 mEq/g and were obtained by hydrolyzing a copolymer of $CF_2$=$CF_2$ and $CF_2$=$CFOCF_2CF(CF_3)O(CF_2)_3SO_2F$, was dissolved in a 50/50 parts by mass mixed solution of water and ethanol in an amount of 20% by mass. Zirconium oxide having a primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

Electrolysis was conducted using the ion exchange membrane obtained as above. The electrolysis was performed for 7 days at a current density of 6 kA/m² at a temperature set to 85° C. in the above-described electrolytic cell in which the fluorine-containing polymer layer A was disposed to face the anode side. Measured items were the electrolytic voltage, current efficiency, and amount of sodium chloride in the produced caustic soda, and were all measured 7 days after the beginning of the electrolysis to evaluate electrolytic performance. At this time, the value of (ion cluster diameter of layer B after electrolysis)/(ion cluster diameter of layer B before electrolysis) was 0.98. Current efficiency was measured by the same method as in Example 1.

Comparative Example 2

As a fluorine-containing polymer A-1, a monomer represented by the above general formula (1) ($X_1$=F, $X_2$=F) and a monomer represented by the above general formula (2) (a=1, b=2, Y=$CF_3$) were copolymerized in a molar ratio of 5:1 to give a polymer having an ion exchange capacity of 1.05 mEq/g.

As a fluorine-containing polymer A-2, a monomer represented by the above general formula (1) ($X_1$=F, $X_2$=F) and a monomer represented by the above general formula (2) (a=1, b=2, Y=$CF_3$) were copolymerized in a molar ratio of 5.7:1 to give a polymer having an ion exchange capacity of 0.99 mEq/g.

As fluorine-containing polymer B for forming the fluorine-containing layer B, a monomer represented by the above general formula (1) ($X_1$=F, $X_2$=F) and a monomer represented by the above general formula (3) (c=1, d=2, Y=$CF_3$, R=$CH_3$) were copolymerized in a molar ratio of 7.5:1 to give a polymer having an ion exchange capacity of 0.89 mEq/g.

The resulting fluorine polymer A-2 and fluorine polymer B were coextruded with an apparatus equipped with 2 extruders, a coextrusion T die for 2 layers, and a take-up machine, to give a two-layer film (a6) having a thickness of 93 μm. As a result of observing the cross section of the film under an optical microscope, the thickness of the layer A-2 was 80 μm, and the thickness of the layer B was 13 μm. A single-layer film (b6) having a thickness of 20 μm for the layer A-1 was obtained with a single-layer T die.

On a drum having a heat source and a vacuum source inside and having a large number of microporous pores in the surface, an air-permeable, heat-resistant release paper, the single-layer film (b6), a reinforcement core material, and the two-layer film (a6) were laminated in this order and integrated into a single body while eliminating air between the materials at a temperature of 230° C. under a reduced pressure of −650 mmHg to give a composite membrane. The same reinforcement core material as in Example 1 was used.

This composite membrane was hydrolyzed at a temperature of 50° C. for 0.5 hours in an aqueous solution containing 30% by mass of DMSO and 4.0 N of KOH and then subjected to salt exchange treatment for 5 hour under 95° C. conditions using a 0.6 N NaOH solution.

A fluorine polymer having a sulfonic acid group, which had an ion exchange capacity of 1.0 mEq/g and were obtained by hydrolyzing a copolymer of $CF_2$=$CF_2$ and $CF_2$=$CFOCF_2CF(CF_3)O(CF_2)_3SO_2F$, was dissolved in a 50/50 parts by mass mixed solution of water and ethanol in an amount of 20% by mass. Zirconium oxide having a primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.77. Measurement results are shown in Table 1.

Comparative Example 3

As a fluorine-containing polymer A-1, a monomer represented by the above general formula (1) ($X_1$=F, $X_2$=F) and a monomer represented by the above general formula (2) (a=1, b=2, Y=$CF_3$) were copolymerized in a molar ratio of 5:1 to give a polymer having an ion exchange capacity of 1.05 mEq/g.

As a fluorine-containing polymer A-2, a monomer represented by the above general formula (1) ($X_1$=F, $X_2$=F) and a monomer represented by the above general formula (2) (a=1, b=2, Y=$CF_3$) were copolymerized in a molar ratio of 5.7:1 to give a polymer having an ion exchange capacity of 0.98 mEq/g.

As a fluorine-containing polymer B for forming the layer B, a monomer represented by the above general formula (1) ($X_1$=F, $X_2$=F) and a monomer represented by the above general formula (3) (c=1, d=2, Y=$CF_3$, R=$CH_3$) were copolymerized in a molar ratio of 8.5:1 to give a polymer having an ion exchange capacity of 0.80 mEq/g.

The fluorine polymer A-2 and the fluorine polymer B were coextruded with an apparatus equipped with 2 extruders, a coextrusion T die for 2 layers, and a take-up machine, to give a two-layer film (a5) having a thickness of 93 μm. As a result of observing the cross section of the film under an optical microscope, the thickness of the fluorine-containing layer A-2 was 75 μm, and the thickness of the layer B was 15 μm. A single-layer film (b5) having a thickness of 20 μm for the layer A-1 was obtained with a single-layer T die.

On a drum having a heat source and a vacuum source inside and having a large number of microporous pores in the surface, an air-permeable, heat-resistant release paper, the single-layer film (b5), a reinforcement core material, and the two-layer film (a5) were laminated in this order and integrated into a single body while eliminating air between the materials at a temperature of 230° C. under a reduced pressure of −650 mmHg to give a composite membrane. The same reinforcement core material as in Example 1 was used.

This composite membrane was hydrolyzed at a temperature of 75° C. for 0.75 hours in an aqueous solution containing 30% by mass of DMSO and 4.0 N of KOH and then subjected to salt exchange treatment under 85° C. conditions using a 0.6 N NaOH solution.

A fluorine polymer having a sulfonic acid group, which had an ion exchange capacity of 1.0 mEq/g and were obtained by hydrolyzing a copolymer of $CF_2$=$CF_2$ and $CF_2$=$CFOCF_2CF(CF_3)O(CF_2)_3SO_2F$, was dissolved in a 50/50 parts by mass mixed solution of water and ethanol in an amount of 20% by mass. Zirconium oxide having an average primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.98. Measurement results are shown in Table 1.

Comparative Example 4

As a fluorine-containing polymer A-1, a monomer represented by the above general formula (1) ($X_1$=F, $X_2$=F) and a monomer represented by the above general formula (2) (a=1, b=2, Y=$CF_3$) were copolymerized in a molar ratio of 5:1 to give a polymer having an ion exchange capacity of 1.05 mEq/g.

As a fluorine-containing polymer A-2, a monomer represented by the above general formula (1) ($X_1$=F, $X_2$=F) and a monomer represented by the above general formula (2) (a=1, b=2, Y=$CF_3$) were copolymerized in a molar ratio of 5.7:1 to give a polymer having an ion exchange capacity of 0.98 mEq/g.

As a fluorine-containing polymer B for forming the layer B, a monomer represented by the above general formula (1) ($X_1$=F, $X_2$=F) and a monomer represented by the above general formula (3) (c=1, d=2, Y=$CF_3$, R=$CH_3$) were copolymerized in a molar ratio of 8.5:1 to give a polymer having an ion exchange capacity of 0.80 mEq/g.

The fluorine polymer A-2 and the fluorine polymer B were coextruded with an apparatus equipped with 2 extruders, a coextrusion T die for 2 layers, and a take-up machine, to give a two-layer film (a5) having a thickness of 93 μm. As a result of observing the cross section of the film under an optical microscope, the thickness of the fluorine-containing layer A-2 was 75 μm, and the thickness of the layer B was 15 μm. A single-layer film (b5) having a thickness of 20 μm for the layer A-1 was obtained with a single-layer T die.

On a drum having a heat source and a vacuum source inside and having a large number of microporous pores in the surface, an air-permeable, heat-resistant release paper, the single-layer film (b5), a reinforcement core material, and the two-layer film (a5) were laminated in this order and integrated into a single body while eliminating air between the materials at a temperature of 230° C. under a reduced pressure of −650 mmHg to give a composite membrane. The same reinforcement core material as in Example 1 was used.

This composite membrane was hydrolyzed at a temperature of 90° C. for 0.75 hours in an aqueous solution containing 30% by mass of DMSO and 4.0 N of KOH and then subjected to salt exchange treatment under 85° C. conditions using a 0.6 N NaOH solution.

A fluorine polymer having a sulfonic acid group, which had an ion exchange capacity of 1.0 mEq/g and were obtained by hydrolyzing a copolymer of $CF_2$=$CF_2$ and $CF_2$=$CFOCF_2CF(CF_3)O(CF_2)_3SO_2F$, was dissolved in a 50/50 parts by mass mixed solution of water and ethanol in an amount of 20% by mass. Zirconium oxide having an average primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.97. Measurement results are shown in Table 1.

Comparative Example 5

As a fluorine-containing polymer A-1, a monomer represented by the above general formula (1) ($X_1$=F, $X_2$=F) and a monomer represented by the above general formula (2) (a=1, b=2, Y=$CF_3$) were copolymerized in a molar ratio of 5:1 to give a polymer having an ion exchange capacity of 1.05 mEq/g.

As a fluorine-containing polymer A-2, a monomer represented by the above general formula (1) ($X_1$=F, $X_2$=F) and a monomer represented by the above general formula (2) (a=1, b=2, Y=$CF_3$) were copolymerized in a molar ratio of 5.7:1 to give a polymer having an ion exchange capacity of 0.99 mEq/g.

As a fluorine-containing polymer B for forming the layer B, a monomer represented by the above general formula (1) ($X_1$=F, $X_2$=F) and a monomer represented by the above general formula (3) (c=1, d=2, Y=$CF_3$, R=$CH_3$) were copolymerized in a molar ratio of 7.5:1 to give a polymer having an ion exchange capacity of 0.89 mEq/g.

The fluorine polymer A-2 and the fluorine polymer B were coextruded with an apparatus equipped with 2 extruders, a coextrusion T die for 2 layers, and a take-up machine, to give a two-layer film (a5) having a thickness of 105 μm. As a result of observing the cross section of the film under an optical microscope, the thickness of the fluorine-containing layer A-2 was 80 μm, and the thickness of the layer B was 25 μm. A single-layer film (b5) having a thickness of 20 μm for the layer A-1 was obtained with a single-layer T die.

On a drum having a heat source and a vacuum source inside and having a large number of microporous pores in the surface, an air-permeable, heat-resistant release paper, the single-layer film (b5), a reinforcement core material, and the two-layer film (a5) were laminated in this order and integrated into a single body while eliminating air between the materials at a temperature of 230° C. under a reduced pressure of −650 mmHg to give a composite membrane. The same reinforcement core material as in Example 1 was used.

This composite membrane was hydrolyzed at a temperature of 80° C. for 0.5 hours in an aqueous solution containing 30% by mass of DMSO and 4.0 N of KOH and then subjected to salt exchange treatment under 50° C. conditions using a 0.6 N NaOH solution.

A fluorine polymer having a sulfonic acid group, which had an ion exchange capacity of 1.0 mEq/g and were obtained by hydrolyzing a copolymer of $CF_2$=$CF_2$ and $CF_2$=$CFOCF_2CF(CF_3)O(CF_2)_3SO_2F$, was dissolved in a 50/50 parts by mass mixed solution of water and ethanol in an amount of 20% by mass. Zirconium oxide having an average primary particle size of 1 μm was added to the solution in an amount of 40% by mass, and uniformly dispersed with a ball mill to give a suspension. This suspension was applied to both surfaces of the hydrolyzed, salt-exchanged ion exchange membrane by a spray method and dried to thereby form coating layers.

The electrolysis was conducted using the ion exchange membrane obtained as above. The value of (ion cluster diameter of layer B after electrolysis)/(ion cluster diameter of layer B before electrolysis) was 0.97. Measurement results are shown in Table 1.

The compositions, properties, and the like of the ion exchange membranes of the above Examples and Comparative Examples are shown in Table 1.

TABLE 1

| | | Unit | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|---|
| Layer A-1 (Single-layer film (b)) | Ion exchange capacity | mEq/g | 1.05 | 1.05 | 1.05 | 1.05 | 1.05 | 1.05 | 1.05 | 1.05 | 1.05 | 1.05 |
| | Thickness | μm | 20 | 20 | 20 | 25 | 20 | 20 | 20 | 20 | 20 | 20 |
| Layer A-2 (Composite film (a)) | Ion exchange capacity | mEq/g | 0.99 | 0.99 | 0.99 | 0.95 | 0.99 | 0.99 | 0.99 | 0.98 | 0.98 | 0.99 |
| | Thickness | μm | 80 | 80 | 80 | 85 | 80 | 80 | 80 | 75 | 75 | 80 |
| Layer B (Composite film (a)) | Ion exchange capacity | mEq/g | 0.89 | 0.89 | 0.91 | 0.85 | 0.89 | 0.80 | 0.89 | 0.80 | 0.80 | 0.89 |
| | Thickness | μm | 13 | 13 | 13 | 15 | 13 | 13 | 13 | 15 | 15 | 25 |
| Continuous hole | | | Yes | Yes | Yes | Yes | No | Yes | Yes | Yes | Yes | Yes |
| Structures of fluorine-containing polymers represented by [formula (1), formula (2), formula (3)] | A | — | 1 | 1 | 1 | 1 | 1 | 1 | 1 | 1 | 1 | 1 |
| | B | — | 2 | 2 | 2 | 2 | 2 | 2 | 2 | 2 | 2 | 2 |
| | C | — | 1 | 1 | 1 | 1 | 1 | 1 | 1 | 1 | 1 | 1 |
| | D | — | 2 | 2 | 2 | 2 | 2 | 2 | 2 | 2 | 2 | 2 |
| | $X_1$ | — | F | F | F | F | F | F | F | F | F | F |
| | $X_2$ | — | F | F | F | F | F | F | F | F | F | F |
| | Y (in formula (2)) | — | $CF_3$ | $CF_3$ | $CF_3$ | $CF_3$ | $CF_3$ | $CF_3$ | $CF_3$ | $CF_3$ | $CF_3$ | $CF_3$ |
| | Y (in formula (3)) | — | $CF_3$ | $CF_3$ | $CF_3$ | $CF_3$ | $CF_3$ | $CF_3$ | $CF_3$ | $CF_3$ | $CF_3$ | $CF_3$ |
| | R | — | $CH_3$ | $CH_3$ | $CH_3$ | $CH_3$ | $CH_3$ | $CH_3$ | $CH_3$ | $CH_3$ | $CH_3$ | $CH_3$ |
| Hydrolysis | Temperature | °C. | 80 | 50 | 50 | 80 | 80 | 80 | 50 | 75 | 90 | 80 |
| | Time | Hour | 0.5 | 24 | 24 | 0.5 | 0.5 | 0.5 | 0.5 | 0.75 | 0.75 | 0.5 |
| Salt exchange | Temperature | °C. | 50 | 90 | 95 | 50 | 50 | 50 | 95 | 85 | 85 | 50 |
| | Time | Hour | 1 | 0.5 | 1 | 1 | 1 | 1 | 5 | 1 | 1 | 1 |
| Membrane thickness (after hydrolysis step) | Overall thickness (valley part) | μm | 130 | 117 | 172 | 131 | 130 | 117 | 230 | 123 | 129 | 141 |
| | Layer A | μm | 115 | 104 | 152 | 116 | 115 | 104 | 202 | 108 | 114 | 116 |
| | Layer B | μm | 15 | 13 | 20 | 15 | 15 | 13 | 28 | 15 | 15 | 25 |
| Ion cluster | (Ion cluster diameter of layer B after electrolysis)/ | — | 0.91 | 0.93 | 0.86 | 0.93 | 0.95 | 0.98 | 0.77 | 0.98 | 0.97 | 0.97 |

TABLE 1-continued

|  |  | Unit | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|---|
|  | (Ion cluster diameter of layer B before electrolysis) |  |  |  |  |  |  |  |  |  |  |  |
|  | Ion cluster diameter of layer A before electrolysis | nm | 3.66 | 3.60 | 3.64 | 3.54 | 3.66 | 3.60 | 3.80 | 3.90 | 4.04 | 3.66 |
|  | Ion cluster diameter of layer B before electrolysis | nm | 3.20 | 3.10 | 3.46 | 3.22 | 3.20 | 3.04 | 3.70 | 2.50 | 2.55 | 3.21 |
|  | Ion cluster diameter of layer B after electrolysis | nm | 2.90 | 2.88 | 2.98 | 2.99 | 3.04 | 2.98 | 2.85 | 2.45 | 2.47 | 3.11 |
| Electrolytic performance | Current efficiency | % | 97.3 | 97.5 | 97.4 | 97.1 | 97.3 | 97.1 | 97.4 | 97.8 | 97.5 | 97.8 |
|  | Voltage | V | 3.04 | 3.04 | 3.04 | 3.04 | 3.04 | 3.08 | 3.15 | 3.07 | 3.1 | 3.11 |
|  | Brine concentration in caustic soda | ppm | 14 | 12 | 12 | 15 | 14 | 15 | 12 | 10 | 13 | 10 |
| Strength | Tensile strength | kg/cm | 1.80 | 1.82 | 1.82 | 1.82 | 1.80 | 1.80 | 1.75 | 1.8 | 1.81 | 1.81 |
|  | Tensile elongation | % | 67 | 66 | 66 | 66 | 67 | 66 | 68 | 63 | 67 | 67 |

The ion exchange membranes of Examples 1 to 4 had good electrolytic performance, and also the results of strength evaluation for tensile strength and tensile elongation showed values at which the ion exchange membranes can sufficiently withstand electrolysis.

On the other hand, although the ion exchange membrane of Comparative Example 1 had good results of strength evaluation, the electrolysis voltage was higher than those of Examples 1 to 4.

Although the ion exchange membrane of Comparative Example 2 had good results of strength evaluation, the electrolysis voltage was largely increased.

Although the ion exchange membranes of Comparative Examples 3 and 4 had good results of strength evaluation, the electrolysis voltage was higher than those of Examples 1 to 4.

Although the ion exchange membrane of Comparative Example 5 had good results of strength evaluation, the electrolysis voltage was higher than those of Examples 1 to 4.

The present application is based on a Japanese Patent Application (Japanese Patent Application No. 2015-101292) filed on May 18, 2015, and the content of which is incorporated herein by reference.

INDUSTRIAL APPLICABILITY

The ion exchange membrane of the present invention can be suitably used in the field of alkali chloride electrolysis.

REFERENCE SIGNS LIST

1 Ion exchange membrane
2a Continuous hole
2b Continuous hole
3 Reinforcement core material
4 Layer A
5 Layer B
6 Coating layer
7 Coating layer
8 Portion appearing on anode-side surface of layer A
α Anode side of electrolytic layer
β Cathode side of electrolytic layer
11 Anode
12 Cathode
13 Electrolytic Cell

The invention claimed is:
1. An ion exchange membrane comprising:
a layer A comprising a fluorine-containing polymer having a sulfonic acid group; and
a layer B comprising a fluorine-containing polymer having a carboxylic acid group, wherein
a ratio of an ion cluster diameter of the layer B after electrolysis under the following electrolysis conditions to the ion cluster diameter of the layer B before the electrolysis [(the ion cluster diameter of the layer B after the electrolysis)/(the ion cluster diameter of the layer B before the electrolysis)] is 0.83 to 0.95:
(Electrolysis conditions)
in a zero-gap base electrolytic cell where the ion exchange membrane is disposed between an anode chamber to which a 3.5 N aqueous sodium chloride solution is supplied and a cathode chamber to which a 10.8 N aqueous sodium hydroxide solution is supplied, electrolysis is performed for 7 days under conditions having a temperature of 85° C. and a current density of 6 kA/m$^2$.

2. The ion exchange membrane according to claim 1, wherein
   the ion cluster diameter of the layer B before the electrolysis is 2.5 to 4.0 nm; and
   the ion cluster diameter of the layer B after the electrolysis is 2.0 to 3.3 nm.

3. The ion exchange membrane according to claim 1, wherein a sum of a thickness of the layer A and a thickness of the layer B before the electrolysis is 55 μm or more.

4. The ion exchange membrane according to claim 1, wherein the ion cluster diameter of the layer A before the electrolysis is 3.0 to 4.5 nm.

5. The ion exchange membrane according to claim 1, wherein
   a thickness of the layer A before the electrolysis is 50 to 180 μm; and
   a thickness of the layer B before the electrolysis is 5 to 20 μm.

6. The ion exchange membrane according to claim 1, wherein
   the layer A comprises a polymer of a compound represented by the following formula (2); and
   the layer B comprises a polymer of a compound represented by the following formula (3):

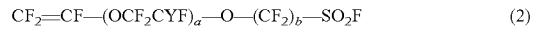

wherein a represents an integer of 0 to 2, b represents an integer of 1 to 4, and Y represents —F or —$CF_3$; and

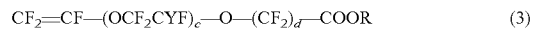

wherein c represents an integer of 0 to 2, d represents an integer of 1 to 4, Y represents —F or —$CF_3$, and R represents —$CH_3$, —$C_2H_5$, or —$C_3H_7$.

7. An electrolytic cell comprising the ion exchange membrane according to claim 1.

* * * * *